July 18, 1939.  J. M. HAIT  2,166,405
MERCURY SEAL
Filed April 30, 1938

Inventor
James M. Hait
By Frank L. Alrahan
Attorney

Patented July 18, 1939

2,166,405

UNITED STATES PATENT OFFICE 2,166,405

MERCURY SEAL

James M. Hait, Los Angeles, Calif., assignor to Food Machinery Corporation, a corporation of Delaware Application April 30, 1938, Serial No. 205,306

10 Claims. (Cl. 286—9)

This invention relates generally to sealing devices, particularly liquid seals such as are used in sealing the junction of a rotating shaft and a stationary member.

This invention is particularly designed for use in combination with a well turbine pump of the type utilizing a submersible motor. The motor housing is ordinarily completely filled with an incompressible lubricating fluid which is entrapped in the housing by means of a sealing compound, such as mercury, in the seal. The seal functions to prevent external fluid from entering the housing and to prevent the internal fluid from escaping from the housing. While the seal is particularly designed for use in connection with a submersible motor and is shown and described in connection therewith, it is contemplated that the seal is adaptable for use in other structures where conditions require the use of a liquid seal.

The ordinary mercury seal in use at the present time in submersible pumps comprises a single cup for holding the liquid and a single dipper which is partially submerged in the mercury contained in the cup. One of these elements is mounted on the shaft and rotates therewith, while the other element is stationary. With this construction the relative velocity of the sealing members (the cup and the dipper) is equal to the relative velocity between the rotating shaft and the stationary supporting means. Mercury seals have a maximum relative velocity between sealing members beyond which the seal becomes ineffective. This is a disadvantage of the ordinary type seal in that it places a limitation upon shaft speeds where shafts are used in conjunction with a seal. In the type of seal now commonly used, shaft speeds in excess of 1760 R. P. M. have been found impracticable.

Therefore it is a primary object of this invention to provide a liquid seal wherein a relatively high shaft speed is permissible without producing a relative velocity between the sealing members of a liquid seal equal to the relative velocity between the rotating shaft and the stationary housing or encasement means.

It is an object of this invention to provide a seal which is effective for shafts rotating at approximately twice the maximum shaft speeds permissible with the ordinary type of seal. In this connection it is an object of this invention to provide a seal in which the relative velocity of the sealing members of the seal is only approximately one-half the relative velocity of the shaft to the stationary elements housing the shaft.

These and other objects will be apparent from the drawing and the following description thereof. Referring to the drawing, which is for illustrative purposes only:

Figure 1:
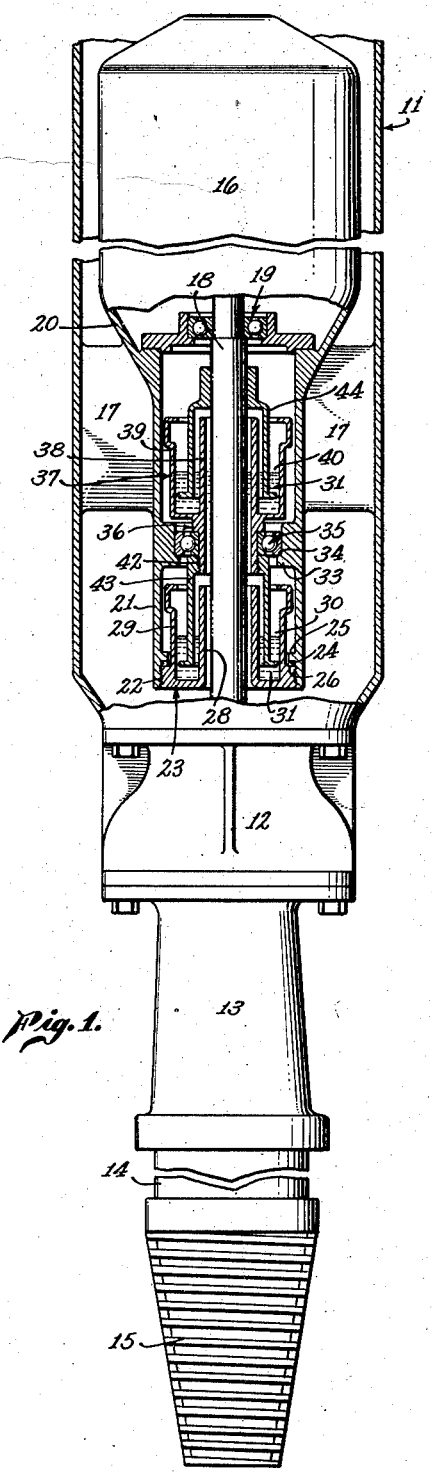
Fig. 1 is a sectional elevation of a submersible well pump showing one form of seal of this invention in combination with a submersible motor and motor shaft.

More particularly describing the invention, reference numeral 11 generally indicates a delivery pipe of the pump which leads to and is supported at the surface of the ground and acts as a conduit for the pumped liquid. At the lower end of the delivery pipe is a bowl 12 adapted to house an impeller (not shown). Reference numeral 13 indicates a suction manifold to which is connected an intake conduit 14 having a strainer inlet member 15 thereon.

Within the delivery pipe there is supported a submersible motor 16 by means of ribs 17. Connecting the motor and the impeller within the bowl 12 is the shaft 18. This shaft is supported by suitable bearings within the motor and within the impeller, one of the motor bearings being indicated by reference numeral 19.

In the form of the invention shown in Fig. 1 the motor housing, indicated by reference numeral 20, has at its lower end a downwardly extending cylindrical portion 21 which is reduced in diameter and which acts as a housing for the seal of this invention. This portion 21 is internally threaded at 22 to accommodate a lower mercury cup 23. A suitable gasket 24 is interposed between an internal flange 25 on the cylindrical portion 21 and a shoulder 26 of the cup 23.

The cup 23 has an upwardly extending inner annular wall 28 and an upwardly extending outer annular wall 29 which together with the lower portion of the cup form a chamber 30 adapted to hold mercury 31.

The cylindrical portion 21 of the motor housing is provided with an internal annular flange 33 which has an annular bearing seat 34 to accommodate a ball bearing generally indicated by reference numeral 35. Supported by the inner race of this bearing is a floating member generally indicated by reference numeral 36. This member has formed at its upper end a mercury cup generally indicated by reference numeral 37 which comprises the inner annular wall portion 38 and the outer annular wall portion 39. The wall portions 38 and 39 form a chamber 40 for the reception of mercury 31. The cup 37 will be referred to as an "upper" cup. The floating member 36 is threaded at 42 to accommodate a downwardly extending dipper member 43. This dipper extends downwardly into the mercury in the stationary cup 23. Mounted on the shaft 18 and adapted to rotate therewith is a rotating dipper member 44 which extends downwardly into the mercury in the upper cup 37.

With the construction just outlined, there is provided a lower stationary mercury cup 23 and an upper floating mercury cup 37. The dipper extending into the poll of mercury 31 in the lower stationary cup 23 is a floating dipper and rotates with the upper mercury cup 37. The upper dipper 44, being mounted on the shaft, rotates therewith. There is thus interposed between the rotating upper dipper 44 operating at shaft speed and the stationary lower cup 23 the floating element 36 comprising the upper mercury cup 37 and the lower dipper 43 which is driven by the friction of the mercury between the rotating dipper 44 and the upper cup 37. The friction of the mercury in the lower stationary cup 23 tends to stop the rotation. The result assuming that the mercury is at the same depth in each cup, is that the floating element 36 tends to rotate at approximately one-half the shaft speed. It can thus be seen that the relative velocity of the sealing portions of the seal, that is, the dipper and cup in the respective upper and lower seals, is approximately one-half of the relative velocity of the shaft and stationary elements of the motor housing through which the shaft passes.

Figure 2:
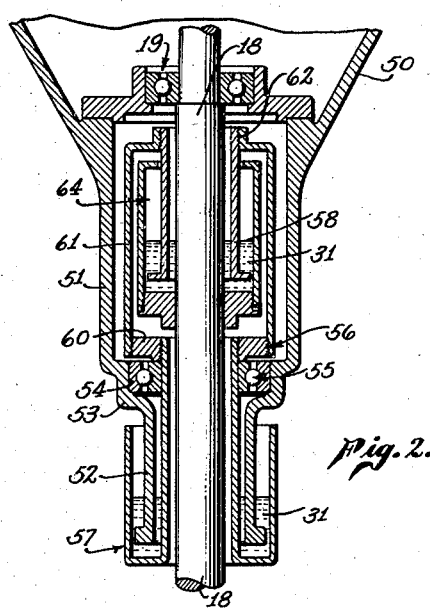
Fig. 2 is a sectional elevation of another form of seal of this invention.

In Fig. 2 another form of the inention is shown wherein an upper and lower seal is used, the upper seal having a floating dipper and the lower seal having a floating cup, as distinguished from the previously described form of the invention shown in Fig. 1 where a floating upper cup and a floating lower dipper is employed.

Referring to Fig. 2 the motor housing, here designated by reference numeral 50 extends downwardly to form a cylindrical portion 51 which has a reduced portion at its lower end forming a dipper 52. An intermediate portion 53 of the housing forms a bearing seat 54 wherein is positioned a ball bearing 55. Mounted on the inner race of the ball bearing is a floating member, generally indicated by reference numeral 56. The lower portion of this floating member 56 forms a lower mercury cup 57 while the upper portion terminates in an upper dipper 58. The floating member 56 comprises an annular plate 60 which is internally and externally threaded to accommodate the lower mercury cup 57 and an upwardly extending upper dipper supporting member 61 which has a reduced threaded end 62. The dipper 58 is threaded into this reduced end 62 and depends therefrom.

An upper mercury cup, generally designated by reference numeral 64, is mounted on the shaft 18 and rotates therewith. Each of the cups is adapted to hold mercury 31.

In the operation of this form of the seal, the floating member 56 forms an upper dipper 58 for the upper mercury cup 64 mounted on the shaft and also forms the lower mercury cup 57 which cooperates with the dipper portion 52 formed on the lower extremity of the motor housing extension 51. In this construction the floating member rotates at approximately half the speed of the shaft as described in connection with the form of the invention shown in Fig. 1 so that in the case of each seal the relative velocity of the sealing members (cup and dipper) to each other is approximately one-half the relative velocity of the shaft 18 to the motor 50. Explicitly, the upper cup rotates at shaft speed, while the upper dipper member corresponding with that cup operates at approximately one-half shaft speed. The lower cup rotates with the upper dipper at approximately one-half the shaft speed while the lower dipper is stationary. The mercury 31 is of course contained in each of the cups.

Figure 3:
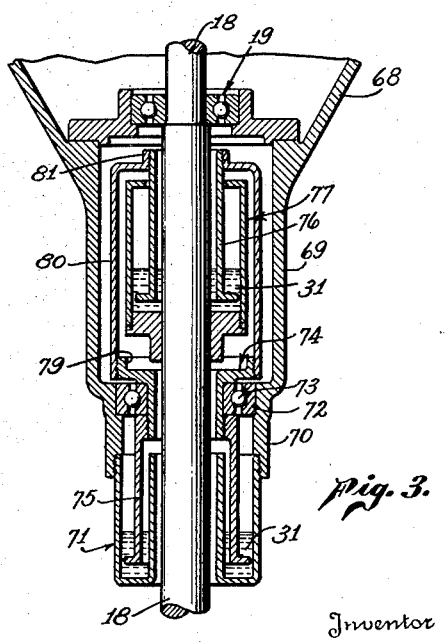
Fig. 3 is a sectional elevation of a third form of seal of this invention.

Referring to Fig. 3 for details of another form of the invention wherein both dippers are mounted for floating movement, reference numeral 68 indicates the motor housing which has an extended portion 69 terminating in a reduced lower end 70. The lower end 70 is internally threaded to support a lower mercury cup 71.

The reduced lower end 70 has an internal bearing seat 72 to accommodate the ball bearing 73. Mounted on the inner race of the ball bearing is a floating member 74, the lower end of which forms a lower dipper 75 which extends into the lower cup 71. The upper portion of the floating member 74 forms an upper dipper 76 which cooperates with an upper cup member 77 mounted upon and rotating with shaft 18. The elements of the floating member 74 comprise an annular body member 79 which is externally threaded at each end so that the dipper 75 may be threaded on the lower end and the upper dipper supporting member 80 may be threaded on the upper end. The upper dipper supporting member 80 has a reduced upper end 81 which is internally threaded to accommodate the upper dipper 76.

In this form of the invention both the upper and lower dippers are floating, the upper cup 77 being mounted on the shaft for rotation therewith, while the lower cup 71 is mounted on the motor housing, and consequently is stationary. The upper cup 77 rotates at shaft speed and through the medium of mercury imparts rotation to the floating member 74 so that the upper dipper 76 rotates at approximately half the speed of the shaft. In this connection the lower cup being stationary, it counteracts the tendency of the floating member to rotate at shaft speed. Relative velocity of the sealing elements in each case is approximately half that of the relative velocity of the shaft to the motor housing, as in the other forms of the invention.

Although in the description of the invention mercury has been designated as the sealing liquid, it is within the scope of the invention to use some other liquid having a greater specific gravity than the two liquids to be separated.

The seal of this invention has been particularly shown and described for use in a submersible pump wherein the motor is located above the impellers and the shaft passes through the lower end of the motor housing, however, it is within the scope of this invention to utilize the seal in submersible pumps wherein the shaft passes through the upper end of the motor housing. It is not intended therefore to limit the invention to the exact structure shown in the drawing but the invention is to be given the full scope of the following claims.

I claim as my invention:

1. In a liquid seal of the type described for use in combination with a housing having a rotatable shaft extending thereinto: a sealing device comprising a dipper element, and a cup element adapted to receive the dipper element; a second sealing device comprising a dipper element, and a cup element adapted to receive the dipper element; a sealing liquid in each of said cup elements; one of the elements of said first mentioned sealing device being mounted on said shaft and one of the elements of said second sealing device being mounted on said housing; the other elements of said sealing devices being integral and rotatably mounted in said housing independently of said shaft.

2. In a liquid seal of the type described for use in combination with a housing having a rotatable shaft extending thereinto: an upper seal comprising a cup, a sealing liquid in said cup, and a dipper extending into the sealing liquid in said cup; a lower seal comprising a cup, a sealing liquid in said cup, and a dipper extending into the sealing liquid in said cup; one of the elements comprising said upper seal being mounted on said shaft and one of the elements comprising said lower seal being mounted in said housing; one of the elements comprising said upper seal and one of the elements comprising said lower seal being integral and forming a floating member rotatably mounted in said housing.

3. In a liquid seal of the type described for use in combination with a housing having a rotatable shaft extending thereinto: a member forming a lower cup mounted in the bottom of said housing; a floating member rotatably mounted in said housing and having a dipper formed on its lower end extending into said lower cup and having an upper cup formed on its upper end; a dipper member mounted on said shaft and extending into said upper cup; and a sealing liquid in each of said cups.

4. In a liquid seal of the type described for use in combination with a housing having a rotatable shaft extending thereinto: said housing having an extended portion surrounding said shaft; a member forming a lower mercury cup mounted on the lower end of the extended portion of said housing; a floating member rotatably mounted in the extended portion of said housing, said floating member comprising a cup element, and a dipper element dependingly mounted on said cup element, said dipper element extending into said lower cup; a dipper member mounted on said shaft and extending into the cup of said floating member; and mercury in each of said cups.

5. In a liquid seal of the type described for use in combination with a housing having a rotatable shaft extending thereinto: said housing having an extended portion terminating in a stationary dipper; a cup mounted on said shaft vertically spaced from said stationary dipper; a floating member rotatably mounted in said extended portion of said housing, said floating member having a cup formed on its lower end adapted to receive said stationary dipper and having a dipper member formed on its upper end adapted to extend into said cup mounted on said shaft; and a sealing liquid in each of said cups.

6. In a liquid seal of the type described for use in combination with a housing having a rotatable shaft extending thereinto: said housing having an extended portion terminating in a stationary dipper; a mercury cup mounted on said shaft vertically spaced from said stationary dipper; a floating member rotatably mounted in said extended portion of said housing, said floating member comprising an internally and externally threaded annular plate, a cup threaded into said plate depending therefrom and adapted to receive said stationary dipper, a dipper supporting member threaded on said plate and extending upwardly therefrom and having a reduced internally threaded upper end portion, and a dipper threaded into said reduced portion of said dipper supporting member and extending into the mercury cup mounted on said shaft; and mercury in each of said cups.

7. In a liquid seal of the type described for use in combination with a housing having a rotatable shaft extending thereinto: said housing having an extended portion surrounding said shaft; a lower cup mounted in the lower end of said extended portion; a cup rigidly mounted on said shaft vertically spaced from said lower cup; a floating member rotatably mounted in said extended portion of said housing, said floating member having a dipper formed on its lower end adapted to extend into said lower cup and having a dipper formed on its upper end adapted to extend into the cup mounted on said shaft; and a sealing liquid in each of said cups.

8. In a liquid seal of the type described for use in combination with a housing having a rotatable shaft extending thereinto: said housing having an extended portion terminating in a reduced internally threaded lower end portion; a lower mercury cup mounted in said lower end of said extended portion; a mercury cup rigidly mounted on said shaft vertically spaced from said lower cup; a floating member rotatably mounted in said extended portion of said housing, said floating member comprising a body member, a dipper mounted on the lower end of said body member and adapted to extend into the lower mercury cup, a dipper supporting member mounted on the upper end of said body member and having a reduced internally threaded upper end portion, and a dipper member dependingly mounted in said reduced upper end portion and extending into said mercury cup mounted on said shaft; and mercury in each of said cups.

9. An apparatus for forming a fluid seal between a shaft and a housing comprising: a plurality of fluid sealing devices disposed in series, each of said devices including a cup member having a body of sealing liquid therein, and a dipping member extending into said liquid; one of the members of each sealing device being united with one of the members of the adjacent sealing device, and the terminal members of said sealing devices being attached to the shaft and housing respectively; and means journalling said united members for rotation relative to both the shaft and housing.

10. In a liquid seal device for deep well pumps comprising a casing and a shaft, a plurality of cup members for holding a liquid sealing material within said casing and surrounding said shaft, a plurality of dipper members arranged to dip into the said liquid sealing material, one of said plurality of members having free movement relative to said casing and shaft so that the speed of rotation of said member is dependent on the frictional drag of said member due to being in contact with said sealing material, another of said members being secured to said shaft, and one member secured to the said casing.

JAMES M. HAIT.